United States Patent
Doyle

(10) Patent No.: US 7,091,882 B2
(45) Date of Patent: Aug. 15, 2006

(54) AUTOMATED EXCHANGE FOR DETERMINING AVAILABILITY OF ASSETS SHAREABLE AMONG ENTITIES

(75) Inventor: Thomas F. Doyle, San Diego, CA (US)

(73) Assignee: Terion, Incorporated, Plano, TX (US)

( * ) Notice: Subject to any disclaimer, the term of this patent is extended or adjusted under 35 U.S.C. 154(b) by 675 days.

(21) Appl. No.: 09/866,865

(22) Filed: May 29, 2001
(Under 37 CFR 1.47)

(65) Prior Publication Data
US 2002/0180617 A1    Dec. 5, 2002

(51) Int. Cl.
G08G 1/123    (2006.01)

(52) U.S. Cl. ............ 340/988; 340/539.13; 340/539.17; 340/539.22; 340/667; 340/686.1; 340/825.29; 340/994; 705/5; 705/13

(58) Field of Classification Search ................ 340/988, 340/539.13, 425.5, 933, 994; 224/510, 924, 224/519; 705/5, 13, 15, 26; 455/456.6
See application file for complete search history.

(56) References Cited

U.S. PATENT DOCUMENTS

| | | | |
|---|---|---|---|
| 3,665,397 A | 5/1972 | Di Napoli et al. | 340/5.42 |
| 4,009,375 A | 2/1977 | White et al. | 455/517 |
| 4,083,003 A | 4/1978 | Haemmig | |
| 4,651,157 A | 3/1987 | Gray et al. | 342/457 |
| 4,750,197 A | 6/1988 | Denekamp et al. | 455/404.2 |
| 4,884,208 A | 11/1989 | Marinelli et al. | 701/300 |
| 4,897,642 A | 1/1990 | DiLullo et al. | 340/10.41 |
| 5,223,844 A | 6/1993 | Mansell et al. | 342/357.07 |
| 5,289,369 A | 2/1994 | Hirshberg | 705/13 |
| 5,633,875 A | 5/1997 | Hershey et al. | 370/346 |
| 5,661,652 A | 8/1997 | Sprague et al. | 455/456.2 |
| 5,686,888 A | 11/1997 | Welles, II et al. | 340/539.13 |
| 5,726,885 A * | 3/1998 | Klein et al. | 455/456.6 |
| 5,734,963 A | 3/1998 | Fitzgerald et al. | 360/7.25 |
| 5,812,070 A | 9/1998 | Tagami et al. | 340/932.2 |
| 5,832,394 A | 11/1998 | Wortham | 701/1 |

(Continued)

FOREIGN PATENT DOCUMENTS

FR    2 703 200    9/1994

(Continued)

*Primary Examiner*—Benjamin C. Lee
(74) *Attorney, Agent, or Firm*—Hamilton, Brook, Smith & Reynolds, P.C.

(57) ABSTRACT

An automated exchange for determining the availability of mobile assets that are shareable among mobile asset users. The automated exchange includes a plurality of mobile asset sources for providing mobile assets of one or more types, a data center for providing the availability status of each mobile asset, and asset status and availability inputs having communication connection to the data center. The asset status and availability inputs include mobile asset sensors, asset monitoring sensors, manual inputs, and asset status and availability record. A processor located at the data center determines the availability of each mobile asset using the status and availability input data. The processor also receives and processes requests for available mobile assets. A user computer having a communication link to the data center provides user access to information relating to the availability of the mobile assets and user interface to request for available mobile assets. The data center may be connected to an intermediary business entity. The intermediary business entity also facilitates and automates recurring rental transactions and exchanges among long-term users and mobile asset sources. The intermediary business entity also may form a contractual relationship with the users and mobile asset sources to broker transactions using the asset status and availability information from the data center and provide periodic transaction balance and billing statements.

33 Claims, 5 Drawing Sheets

U.S. PATENT DOCUMENTS

| | | | |
|---|---|---|---|
| 5,862,671 A | 1/1999 | Lessard et al. | 62/55.5 |
| 5,867,801 A | 2/1999 | Denny | 701/35 |
| 5,878,282 A | 3/1999 | Mital | 710/62 |
| 5,887,176 A | 3/1999 | Griffith et al. | 713/320 |
| 5,933,100 A | 8/1999 | Golding | |
| 5,948,040 A * | 9/1999 | DeLorme et al. | 701/201 |
| 5,973,619 A * | 10/1999 | Paredes | 340/994 |
| 6,006,148 A | 12/1999 | Strong | 701/33 |
| 6,026,375 A * | 2/2000 | Hall et al. | 705/26 |
| 6,142,372 A | 11/2000 | Wright | 235/382 |
| 6,253,980 B1 * | 7/2001 | Murakami et al. | 224/510 |
| 6,314,183 B1 | 11/2001 | Pehrsson et al. | 379/433.06 |
| 6,317,720 B1 * | 11/2001 | Murakami et al. | 705/10 |
| 6,453,298 B1 * | 9/2002 | Murakami et al. | 705/8 |
| 6,456,207 B1 * | 9/2002 | Yen | 340/994 |
| 6,523,041 B1 * | 2/2003 | Morgan et al. | 707/102 |
| 6,636,145 B1 * | 10/2003 | Murakami et al. | 340/5.9 |
| 6,696,981 B1 * | 2/2004 | Hashimoto | 340/988 |
| 6,701,300 B1 * | 3/2004 | Murakami et al. | 705/10 |

FOREIGN PATENT DOCUMENTS

| | | |
|---|---|---|
| WO | WO 89/03106 | 4/1989 |

* cited by examiner

AUTOMATED EXCHANGE FOR DETERMINING AVAILABILITY OF ASSETS SHAREABLE AMONG ENTITIES

BACKGROUND OF THE INVENTION

The present invention has particular application to shareable mobile assets such as tractor-trailers. However, the invention is also applicable to other types of mobile assets such as railroad cars, buses, boats and any other types of mobile assets that are shareable among entities wherein it is desirable to monitor their location and status, such as to determine the availability thereof.

Mobile asset management is a major concern in various industries such as trucking, railroad and rental cars. The asset manager must keep track of the status and location of each mobile asset. The asset manager also must be able to determine the availability of each mobile asset to assess whether there is a shortage or excess of mobile assets at a particular location at present or in the future. To maximize asset utilization, the asset manager must be able to easily share his excess mobile assets and to borrow mobile assets when there is a need.

Systems for tracking and monitoring of mobile assets for fleet management are generally known. In general, a trucking company can use these systems to track the status and location of each tractor-trailer in a fleet to check for proper operating conditions, any misuse, and to monitor the progress of each vehicle for scheduling and security purposes.

Car rental companies have used monitoring and tracking systems for similar purposes. In general, the known systems are used to check status, determine availability, locate each vehicle in the fleet, and automate pick up and drop off.

In the railroad industry sharing railroad cars among companies is generally known. When a railroad company has excess railroad cars that are not in use and available for a certain period of time, the company then tries to rent them out to other railroad companies needing railroad cars during that time. The companies try to best match their needs, based on the period of use, location of railroad cars, and type of railroad cars. Due to the size of the industry, the sharing of railroad cars is limited to a few companies in the industry. In addition, railroad cars are geographically limited to the rail lines.

A rental system typically includes a company that owns a fleet of mobile assets, and users who need access to additional mobile assets for a short or long term period. A user detects the need for additional mobile assets, and then communicates with different companies regarding availability of mobile assets in a desired location. When the user finds a mobile asset that meets his needs, he requests permission to rent the mobile asset. The company and user enter into an agreement that permits the user to use the mobile asset. At the end of the rental term, the user returns the mobile asset and final charges are assessed according to the agreement. These rental systems include only one source of mobile assets that is in the business of renting mobile assets and users needing additional mobile assets. These rental systems do not permit an entity that is not in the business of renting to rent its available mobile assets. So, an entity with excess mobile assets may not rent them out to other users in need of additional mobile assets. Similarly, the user must deal with one rental source of mobile assets at a time. The user cannot view all available mobile assets from different rental sources according to his needs at the same time.

SUMMARY OF THE INVENTION

There exists a need for highly automated exchange for one or more types of mobile assets, which is capable of collecting relevant information from various inputs for highly automated determination of availability of each mobile asset. The system should be capable of providing information about mobile assets to facilitate asset management and, in particular to assess whether there is a need for or excess mobile assets at a location at present or in the future. The system should also provide a mechanism for multiple of users to rent or share available mobile assets in any geographic location with other mobile asset users. In addition, there is a need for an intermediary business to facilitate and automate recurring transactions and exchanges among a plurality of common long-term users and mobile asset sources.

The system provides a highly automated exchange for determining availability of mobile assets shareable among entities.

The present invention comprises a plurality of mobile asset sources for providing mobile assets of one or more types that may be made available, a data center and user computers. In specific embodiments, such mobile assets include trucks, tractor-trailers and rental cars. The plurality of mobile asset sources include users that own or use mobile assets and mobile asset rental companies. Each mobile asset includes at least one mobile asset sensor for detecting status of the mobile asset and wireless communication mechanism for transmitting data relating to the availability of the mobile asset. The data center includes a receiver for receiving data from each mobile asset. The data center also includes a processor programmed to process data from the plurality of mobile assets, develop a record of status information for each mobile asset and evaluate availability of each mobile asset. The data relating to the availability of each mobile asset depends on the type of the mobile asset.

A user computer may be used for providing user interface for a user to access information about authorized mobile assets and view available mobile assets provided by the plurality of mobile asset sources. The user computer is connected to the data center via a communication link. The status and availability information of mobile assets and availability information of mobile assets facilitate mobile asset management and monitoring. The authorized mobile assets may include mobile assets that a user owns or rented from a mobile asset source. For example, the user may access the status and availability information of the mobile assets that he owns and the mobile assets that he has rented from another mobile asset source and currently in use.

The data center typically includes a server system having a network connection to the user computer through a network, such as the internet to transmit information about mobile assets in use and available mobile assets from the plurality of mobile asset sources.

Each mobile asset is equipped with a location detector to detect the location of the mobile asset and transmit location data to the data center. The determination of the location of each mobile asset can be carried out by any of the known existing location systems, such as the Global Positioning System (GPS).

The system may include other inputs to the data center that provide data relevant to determining availability of each mobile asset. One source of inputs may be the users. The users may send data relevant to determining availability of mobile assets. A memory located at the data center might be another source of information. The processor can use the record of each mobile asset that the computer developed and stored in a memory to infer the availability of each mobile asset.

The system may include an intermediary business entity to enable users and mobile asset sources to efficiently manage and use mobile assets by using information relating to the status availability of mobile assets in the data center. The intermediary business entity provides a network of the users and the mobile asset sources to facilitate rental transactions and exchanges of available mobile assets.

The intermediary business entity may form contractual relationship with mobile asset sources and users to conduct transactions of mobile assets that are made available. The intermediary business is then able to broker transactions between mobile asset sources and users by processing a rental request for a mobile asset of a source with excess assets and a rental to a user needing that mobile asset.

The intermediary business entity may also conduct transactions with users and mobile asset sources over a network, such as the Internet. A user may access information relating to the availability of mobile assets from a plurality of mobile asset sources and request rental of a mobile asset over the Internet. The intermediary business entity then processes the rental request with a mobile asset source.

The intermediary business entity further establishes billing relationship which consolidates all rental transactions for a period, resulting in a net debit or credit for each user or mobile asset source. The intermediary business entity provides a billing structure so that each mobile asset source receives a net debit or credit for each period for its participation. The billing could also have provisions for rolling debits or credits forward in time across periods, based on the credit position of each user.

Other objects, advantages and novel features of the present invention will become apparent from the following detailed description of the invention when considered in conjunction with the accompanying drawings.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
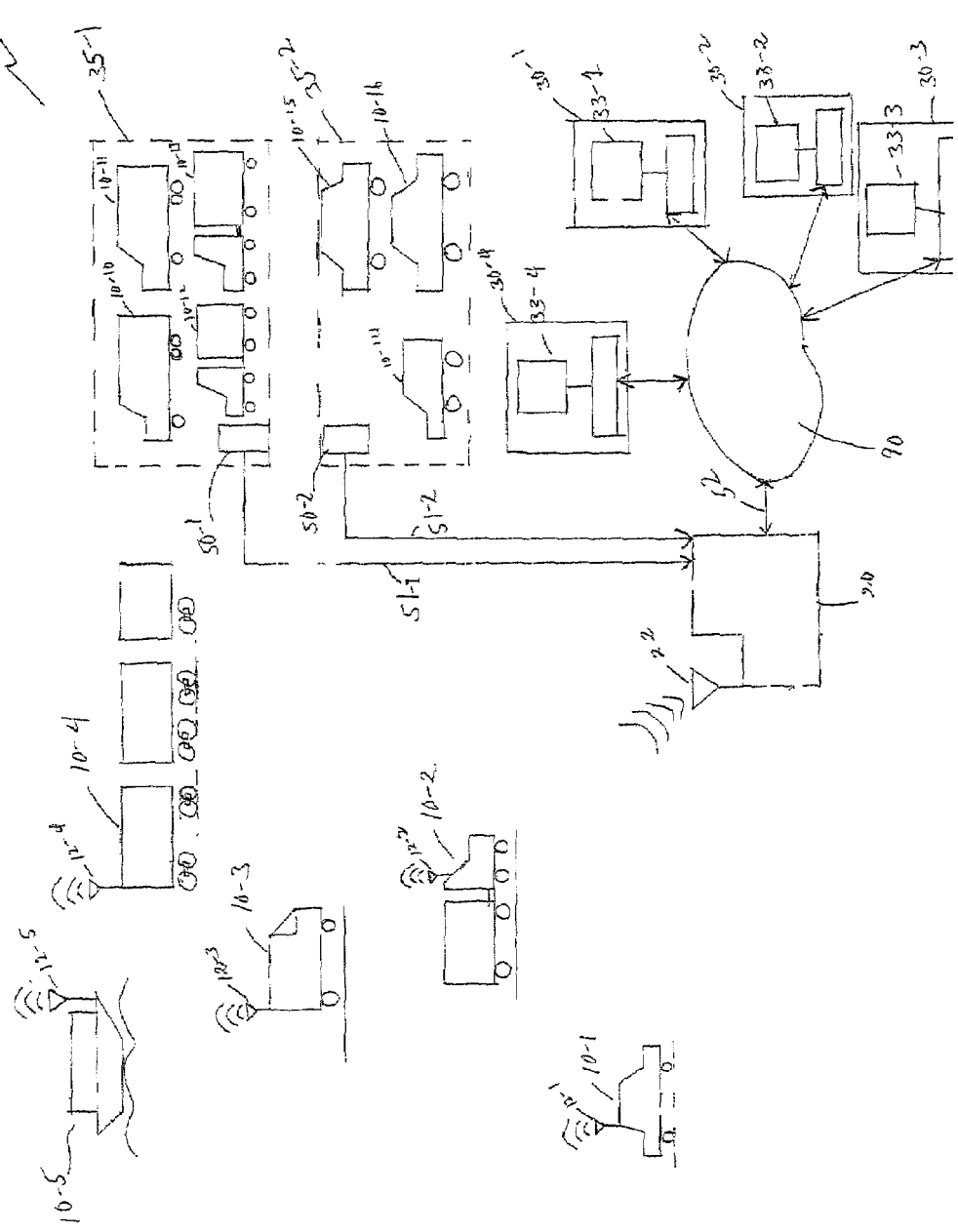
FIG. 1 is a system diagram of the exchange system of the present invention.

Referring now to the drawings, FIG. 1 is a generalized diagram of an automated exchange system 6 for determining the availability of mobile assets 10 that are shareable among users 30. The exchange system 6 provides a highly automated and inexpensive way to share mobile assets 10 among different users 30. The system 6 includes wireless communication mechanism 12, one or more mobile asset garages 35, asset monitoring sensors 50, asset monitoring sensor inputs 51, a data center 20, a receiver 22, a network 90, user computers 33 and one or more types of mobile assets 10 such as a ship 10-5, railroad car 10-4, truck 10-3, tractor-trailer 10-2, and rental car 10-1.

Although it is not shown in FIG. 1, it is understood that the mobile assets 10 are provided by a plurality of mobile asset sources. The plurality of mobile asset sources include mobile asset rental companies and users 30 having excess mobile assets 10 that are available. Each mobile asset source may have one or more types of mobile assets 10. For example, a mobile asset source, such as a truck rental company may have a tractor trailer 10-2 and truck 10-3.

The system 6 makes use of the data center 20 to monitor and determine the availability of each mobile asset 10. The receiver 22 located at the data center 20 receives the status and availability data of each mobile asset 10 transmitted individually by the wireless communication mechanism 12. The data center 20 also receives data relevant to determining availability of each mobile asset 10 from the asset monitoring sensor communication links 51. The asset monitoring sensor communication links 51 connect the asset monitoring sensors 50 to the data center 20.

The communication link 52 connects the data center 20 and the user computers 33 through a network 90, such as the Internet. The communication link 52 and the network 90 connecting the data center 20 and the plurality of user computers 33 provide a manual input of data relating to the availability of the mobile assets 10 to the data center 20. In addition, a user 30-1 may access the status and availability information of the mobile assets 10 in data center 20 using his user computer 33-1. The user computers 33 also provide user interface for requesting one or more mobile assets 10 that are made available.

The asset monitoring sensors 50 are located at different places to monitor the mobile assets 10 and provide status and availability data to the data center 20. One of the places where the asset monitoring sensors can be found is the mobile asset garages 35. The mobile asset garages 35-1 and 35-2 are respectively equipped with the asset monitoring sensors 50-1 and 50-2 to detect one or more parameters relating to the availability of the mobile assets 10. Each asset monitoring sensor 50 has a communication link 51 to transmit data relevant to determining availability of the mobile assets 10 to the data center 20.

The asset monitoring sensors 50-1 and 50-2 respectively located at the mobile asset garages 35-1 and 35-2 monitor whether the mobile assets 10 are in the garages 351 and 35-2. Depending on the type of the mobile asset 10, detection by an asset monitoring sensor 50 that the mobile asset 10 is in a garage 35 might indicate that it is available. For example, when rental cars 10–15 and 10–16 are detected in the mobile asset garage 35-2 by the asset monitoring sensor 50-2, it indicates that the rental cars 1015 and 10–16 are not in use and thus available. However, for other types of mobile assets, it might indicate that the mobile asset 10 is not available. For example, when a tractor-trailer 10–12 is found in the mobile asset garage 35-1, it is probably for repair or cleaning, thus it indicates that the tractor-trailer 10–12 is not available. In addition, the asset monitoring sensors 50 may be located at a physical check-in of rented mobile assets 10, to indicate the return of the mobile assets 10 and its availability.

Figure 2:
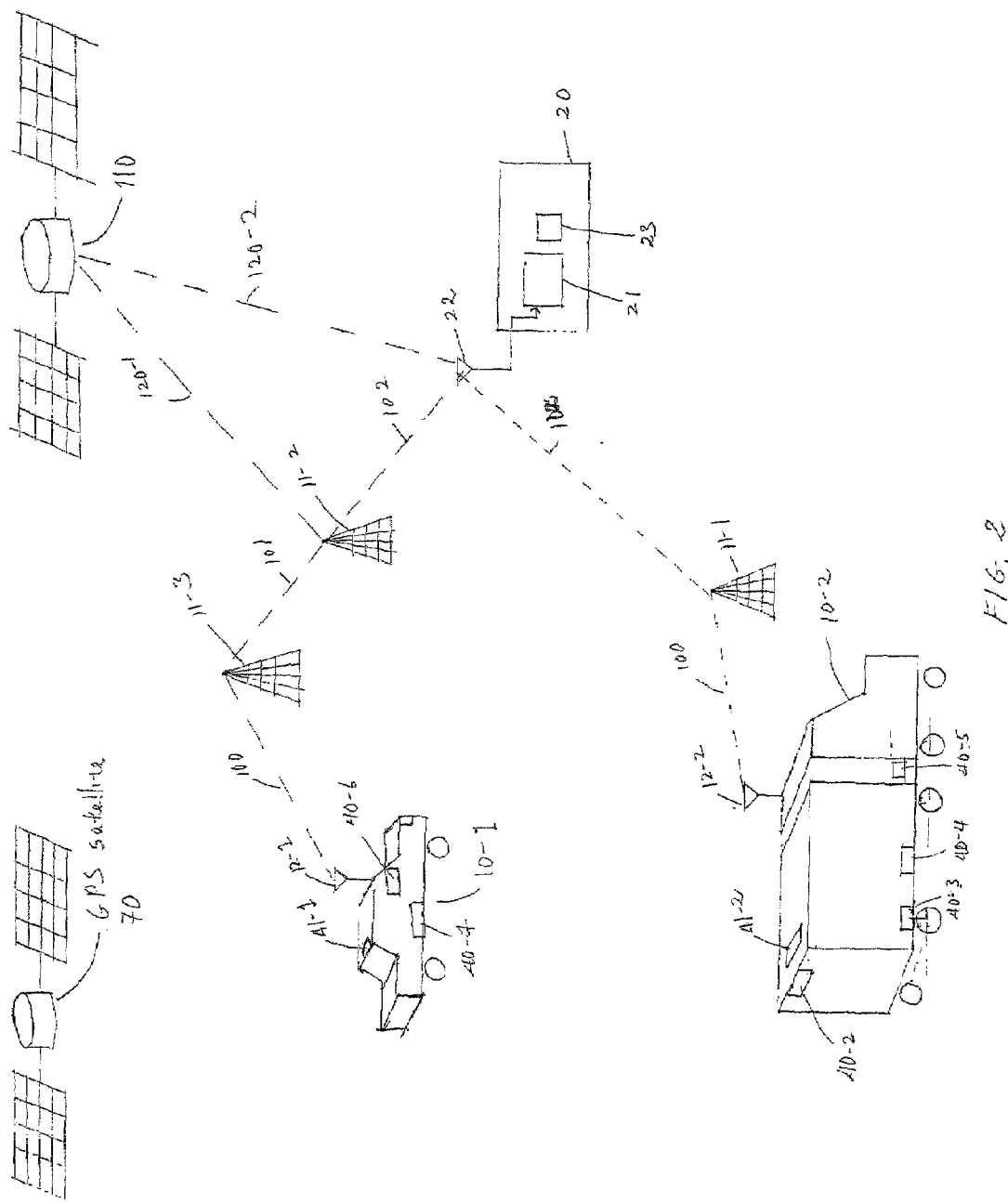
FIG. 2 is a block diagram of mobile assets which have been outfitted with sensors, a location detector and wireless communication equipment and communicating to the data center of FIG. 1.

FIG. 2 is a block diagram of mobile assets 10 which have been outfitted with mobile asset sensors 40, location detectors 41 and wireless communication equipment 12 and communicating to the data center 20 of FIG. 1. The mobile assets 10 make use of a communication system that includes one or more satellites 110, satellite links 120, base stations 11, and base station links 101. Each base station 11 is located in a different region covering a defined area. The mobile assets 10 communicate with the data center 20 via base stations 11. The mobile assets 10 also communicate with the data base 20 via satellites 110 or a combination of satellites 110 and base stations 11.

Such a communication system may preferably be implemented according to U.S. Pat. No. 5,734,963 issued to Fitzgerald et al. and assigned to Terion, Inc., the assignee of the present application, which application is hereby incorporated by reference in its entirety. It has been suggested that this system can be used to track the location of shipping containers carried on ocean going vessels, as described in U.S. Pat. No. 5,995,804 issued to Rootsey et al., which application is also incorporated by reference herein in its entirety.

Other types of two-way communications systems, such as cellular telephone systems or two-way paging systems may be used to provide the wireless data links required between the mobile assets 10 and the data base 20.

The mobile assets 10-1 and 10-2 are equipped with various mobile asset sensors 40 to monitor the status and availability of the mobile assets 10-1 and 10-2. For example, the rental car 10-1 and tractor-trailer 10-2 are respectively equipped with location detectors 41-1 and 41-2. The location detectors 41-1 and 41-2 may be Global Positioning System (GPS) units for providing position and velocity data. One or more GPS satellites 70 provide highly accurate navigation signals which can be used to determine mobile asset location and velocity when the signals are acquired by the GPS units 41-1 and 41-2. The position and velocity information of the rental car 10-1 and tractor-trailer 10-2 is then transmitted by transmitters 12-1 and 12-2 to the data center 20 for monitoring the status and determining the availability of the mobile assets 10-1 and 10-2.

Since information that is relevant to determining availability depends on the type of the mobile asset 10, different sensors are used for different types of mobile assets 10. For a tractor-trailer 10-2, information relating to the availability includes motion of the tractor 10-2, loaded/unloaded status, connection to a trailer, status of the tires, and door activity. Thus, the tractor trailer 10-2 includes a door sensor 40-2, weight sensor 40-4, trailer detector 40-5 and tire monitoring unit 40-3. For a rental car 10-1, the movement information is relevant to determining availability. Thus, the rental car 10-1 has a motion sensor 40-7 and driver detector 40-6.

The existing asset tracking and monitoring equipment may be used to provide data relevant to determining the availability of the mobile assets 10. Many of the parameters monitored by the asset monitoring equipment are relevant to determining availability, such as the distance traveled, hours of use, any mis-use, maintenance or damage and any violations of geographic restrictions. In addition, the asset tracking and monitoring equipment may be used during a rental period to compile information about the use of each mobile asset 10, for billing and security purposes.

It should be understood that other kinds of asset tracking and monitoring equipment, such as Terion's FleetView system, can be used to monitor and determine availability of each tractor-trailer 10.

Each mobile asset source may set their own conditions and criteria for its mobile assets 10 to be available. In such a case, those mobile assets 10 may be equipped with other sensors for detecting the parameters corresponding to those conditions and criteria.

Figure 3:
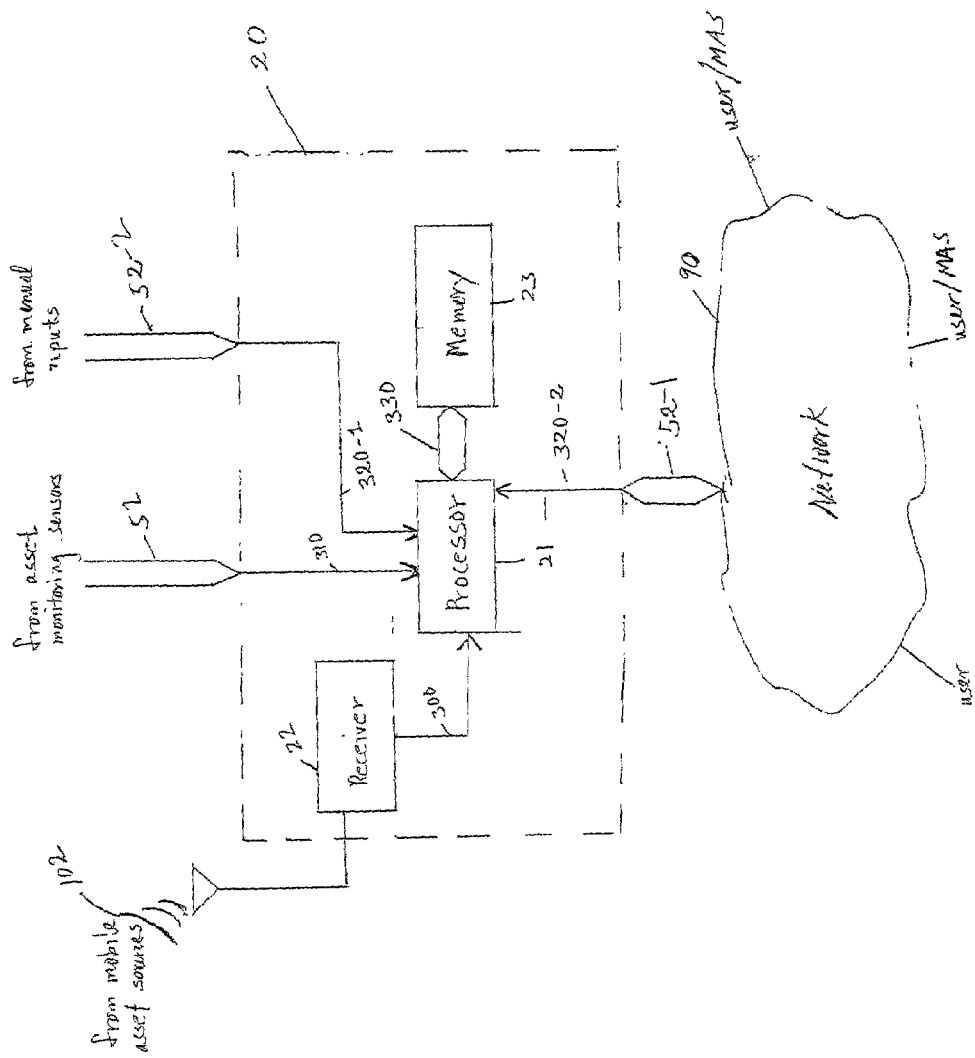
FIG. 3 is a block diagram showing in further detail the data center and its inputs as shown in FIG. 1.

FIG. 3 is a block diagram showing in further detail the data center 20 and its inputs as shown in FIG. 1. The data center 20 includes the receiver 22, processor 21, and memory 23. The receiver 20 receives status and availability data signals 102 from the mobile assets 10. The processor 21 receives and processes the mobile asset sensor inputs 300, asset monitoring sensor inputs 310, user inputs 320, and inferred status inputs 330. The processor 21 also develops a record of status and availability of each mobile asset 10 in the memory 23. The memory 23 stores the status and availability record of each mobile asset 10 and provides inferred status inputs using the record.

The definition of asset availability varies by the type of mobile assets 10. However, in general, it is defined by a set of mobile asset status inputs. The set of inputs include mobile asset sensor inputs 300, asset monitoring sensor inputs 310, user inputs 320, and inferred status inputs 330. The processor uses and combines these inputs to determine the availability of the mobile assets 10.

The mobile asset sensor inputs 300 are provided by the mobile asset sensors 40 attached to the mobile assets 10 and transmitted by the transmitters 12. The receiver 22 receives and send the signals 102 to the processor 21.

The asset monitoring sensor inputs 310 are provided by the asset monitoring sensors 50 through the communication link 51. The asset monitoring sensors 50 are sensors that are not located on the mobile assets 10. For example, as shown in FIG. 1, the asset monitoring sensors may be located at the mobile asset garages 35 to detect mobile assets 10 that are located at the garages 35.

The inferred status inputs 330 are provided by the memory 23. The processor 21 processes the inputs and stores a record of status and availability data of each mobile asset in the memory 23. In determining the availability of each mobile asset, the processor 21 uses the record as another input. The record may include general tendencies relating to availability of each mobile asset. For example, the record may indicate that some mobile assets 10 more likely to be available in certain months. It may also indicate that some mobile assets are available periodically or available for a short term. The processor uses this kind of information in combination with other inputs to determine the availability of the mobile assets 10.

The record also may include rental booking transactions of each mobile asset which shows those mobile assets 10 that are currently rented. The record of transactions may include data such as the distance traveled, hours of use, any mis-use, maintenance or damage and any violations of geographic restrictions for billing purposes.

The user manual inputs 320 are provided by the mobile asset sources and/or users 30. The users 30 may use a separate communication link 52-2 to send the user manual inputs 320-1. However, the users 30 may also use the communication link 52-1 and network 90 connecting the user computers 33 and the data center 20 to send the user manual inputs 320-2. In such a case, the user 30-1 uses the user computer 33-1 to input data relating to the availability of the mobile assets 10 to the processor 21. The user may specify when a mobile asset 10 is available. Alternatively, the user may specify when the mobile asset is not available and is in use. In addition, the mobile asset source determines the use of its fleet of mobile assets and allow certain mobile assets for rent. So, the mobile asset source sends data inputs 320 such as the period of availability and terms of rental, to the data center 20 via communication link 52-1 and network. 90.

The communication link 52-1 and network 90 is also used by the data center 20 to provide the availability information of the mobile assets 10 to the users 30. The availability information determined by the processor 21 is accessed through the communication link 52-1 and network 90. The users 30 also may use the network 90 to share mobile asset information and conduct rental transactions and exchanges with each other.

Figure 4:
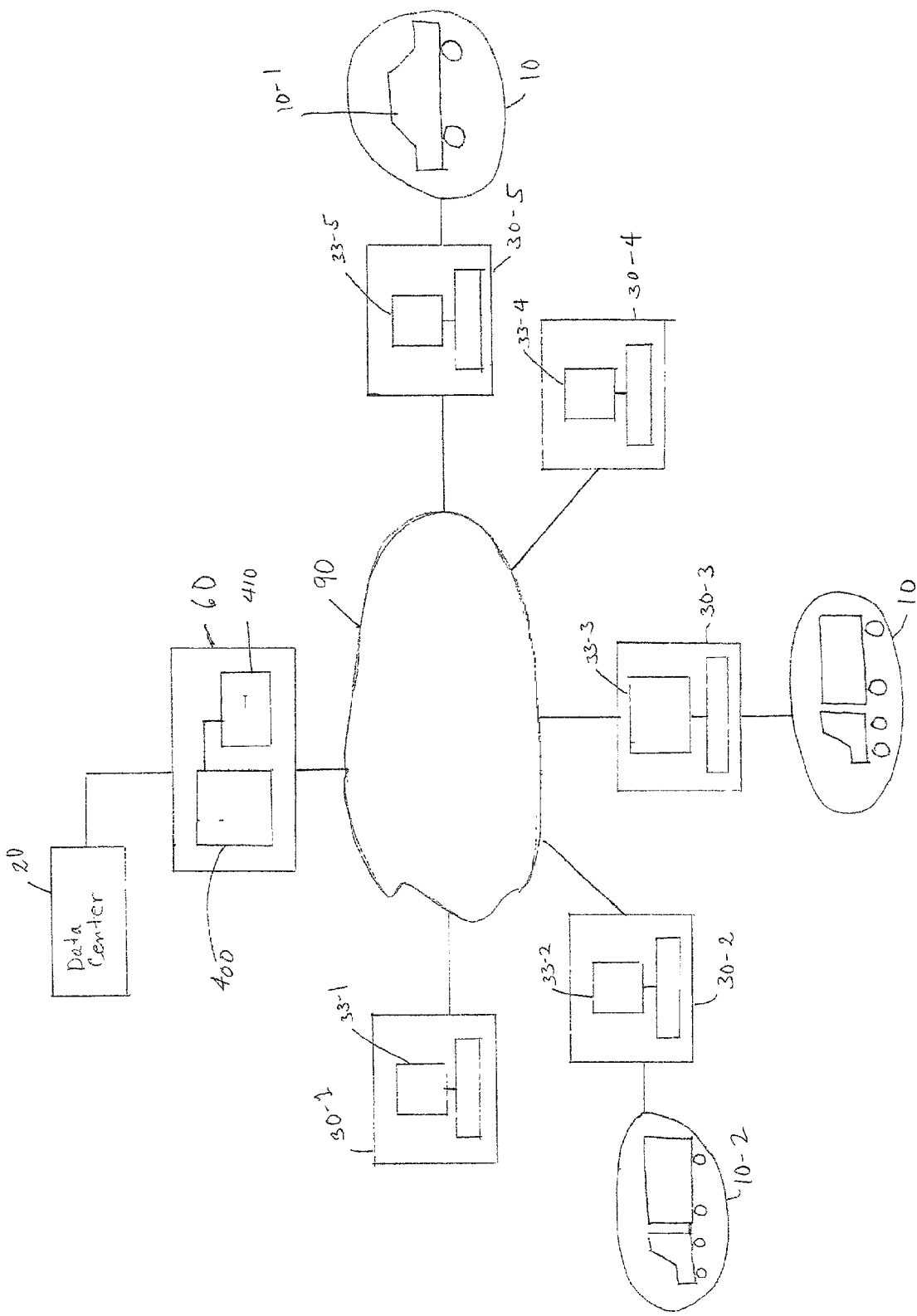
FIG. 4 is a block diagram of the intermediary business entity connected to users through a network.

FIG. 4 is a block diagram of the intermediary business entity 60 connected to users 30 through the network 90. The exchange system 6 may include the intermediary business entity 60 that is a separate entity from the data center 20 to provide the user access, user interface and asset management aspects of the system 6. The intermediary business entity 60 provides a network 90 such as the Internet, to the users 30 for facilitating exchanges of the mobile assets 10 that may be available and efficiently managing the mobile assets 10. The intermediary business entity 60 includes a server 400 and memory 410. The data center 20 is connected to the intermediary business entity 60 to provide the status and availability information of the mobile assets 10.

The users 30 simply refers to entities or persons that use mobile assets 10. Some users 30 are also mobile asset sources. A user 30 who has one or more mobile assets 10 is a mobile asset source. The users 30-5, 30-3, and 30-2 have mobile assets 10 and thus are also mobile asset sources. The mobile asset sources 30-5, 30-3 and 30-2 may have rented or own their mobile assets 10. In either case, the mobile asset sources 30-5, 30-3 and 30-2 may rent out or exchange their mobile assets 10 to other users 30. For example, the mobile asset source 33-2 might have rented his mobile assets 10-2 from the user 30-1 for one month. If the mobile asset source 33-2 finished using the mobile assets and the one month term has not expired then, the mobile asset source 33-2 may make the mobile assets 10-2 available for other users 30 to use for the rest of the one month term. In another example, the mobile asset source 30-3 may own those mobile assets 10 and has excess mobile assets that are not in use. The mobile asset source 30-3 may make his excess mobile assets available for other users 30.

The intermediary business entity 60 provides user access to the status and availability information of the mobile assets 10 provided by the plurality of mobile asset sources. The server 400 provides the status and availability information through the network 90. In other words, the intermediary business entity 60 is providing a network of users 30 and mobile asset sources where they can share the status and availability information with each other. Through the network 90 and intermediary business entity 60, the user 30-1 may access the status and availability information of the mobile assets 10-1 of the user/mobile asset source 30-5. Similarly, other users 30 may access each others mobile asset information.

The users 30 access the status and availability information using the user computers 33. The users 30 may select to see available mobile assets from the plurality of mobile asset sources by geographic location. For example, when the user 30-1 notes that additional mobile assets 10 are needed at a location, or will be needed within a future time horizon, the user 30-1 can request a search of available mobile assets 10 within a search radius around that location.

A user 30 is able to see the status of authorized mobile assets 10. The authorized mobile assets 10 include the ones that the user 30 owns or that the user 30 has rented from one or more mobile asset sources. The authorized mobile assets 10 also include any mobile assets 10 that are in use by the user 30. For example, when the user 30-1 rents a mobile asset 10-1 from the user/mobile asset source 30-5, the user 30-1 is granted authority to view the status of the rented mobile asset 10-1 during the rental period. In addition the status of the mobile asset 10-1 is changed to "not available" for rental purposes. The status and availability information is also provided to the user/mobile asset source 30-5.

The intermediary business entity 60 also facilitate rental transactions and exchanges among the users 30. Using the information and network provided by the intermediary business entity 60, the user 30-1 in need of one or more mobile assets 10 may contact the mobile asset source 30-3 through the network 90 via the intermediary business entity to request to rent one or more mobile asset 10 that are made available. Similarly, the mobile asset source 30-3 may exchange its mobile assets 10 with the mobile asset source 30-5.

The intermediary business entity also develops and stores a record of rental transactions and exchanges in the memory. The record may be used for billing purposes. At the end of each month or quarter, the intermediary business entity may provide billing statements to each user 30.

Figure 5:
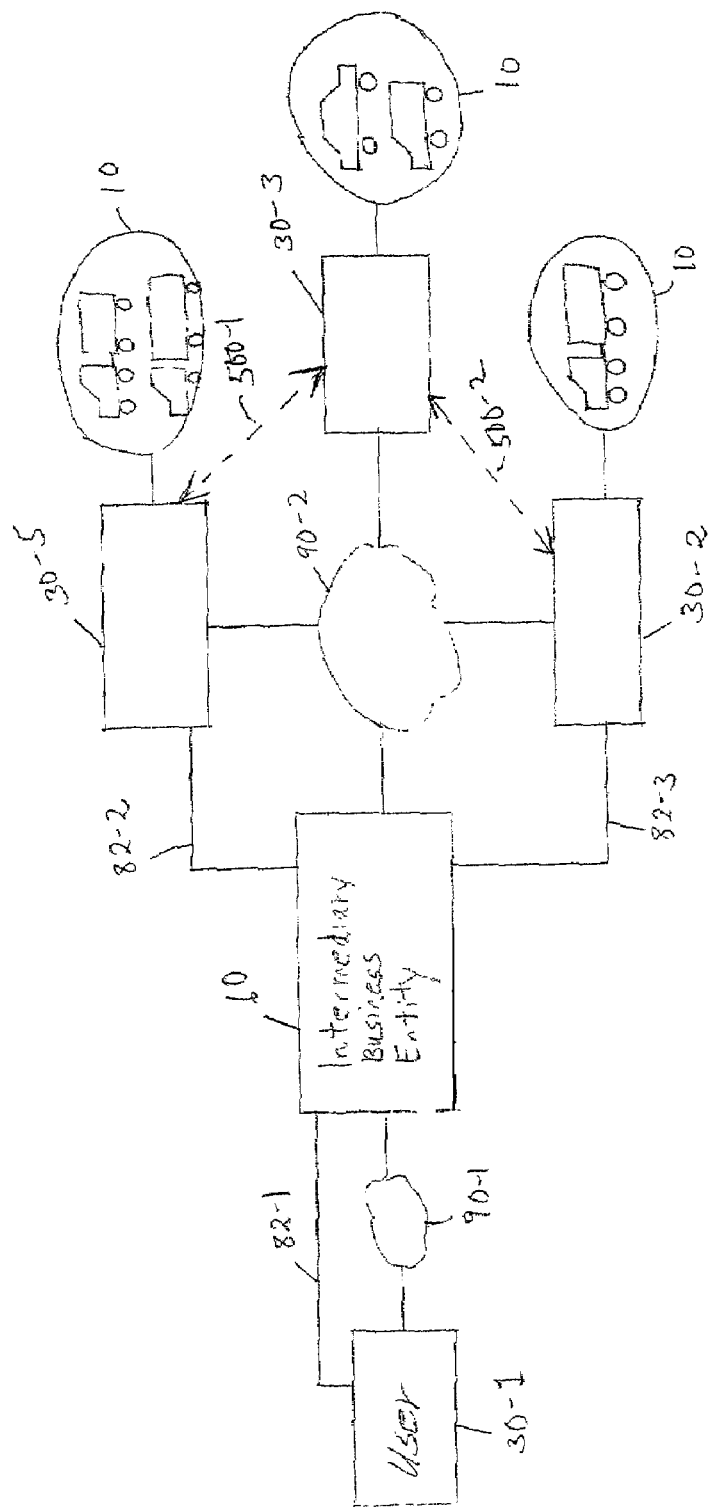
FIG. 5 is a block diagram of an exchange transaction taking place over an intermediary business entity.

FIG. 5 is a block diagram of an exchange transaction taking place over the intermediary business entity 60. The intermediary business entity 60 begins to add value when the number of users 30 and mobile asset sources becomes significant. The intermediary business entity 60 enables mobile asset sources and users 10 to access each others mobile assets 10 while establishing only one business relationship with the intermediary business entity 60.

The intermediary business entity 60 facilitates and conducts transactions between mobile asset sources and users 30 by processing rental requests using the status and availability information from the data center 20. The intermediary business entity also forms contractual relationships 82 with the users 30 allowing the intermediary business entity 60 to conduct rental transactions and exchanges among the contracted users 30 and mobile asset sources. So, the intermediary business entity 60 eliminates the need for a user to negotiate and form a new agreement every time there is a rental transaction or exchange.

For example, the user 30-1 makes a request to the intermediary business entity 60 through the network 90-1 when the user 30-1 is in need of one or more mobile assets at present or in the future. The intermediary business entity 60 finds available mobile assets according to the conditions specified by the user 30-1 using the status and availability information in the data center 20. If the available mobile assets 10 are in possession of one of the contracted users/mobile asset sources then the rental transaction or exchange is carried out according to the terms of the agreement 82. However, if the intermediary business entity 60 does not have an agreement 82 with the mobile asset source 30-3, then the intermediary business entity 60 submits the applicable information from the user 30-1 to the mobile asset source 30-3 through the network 90-2. The mobile asset source 30-3 then processes the rental request according to its business rules. Upon completion of the request, an acknowledgment is sent to the user 30-1 either confirming the rental, denying the rental, or requesting for additional information. The intermediary business entity 60 may iterate the process of gathering information, submitting to the mobile asset source 31, and responding to the user 30.

Similarly, exchanges between the mobile asset sources may be performed through the intermediary business entity 60. The mobile asset source 30-5 or 30-2 may directly conduct rental transactions or exchanges 500-1 or 500-2 with the mobile asset source 30-3 that does not have an agreement 82 with the intermediary business entity 60.

The intermediary business entity 60 can engage in a billing relationship which consolidates all rental transactions for a period. This results in a net debit or credit for each entity for a period. The net debit or credit is calculated based on the record of rental transactions and exchanges in the memory 410.

While this invention has been particularly shown and described with references to preferred embodiments thereof. It will be understood by those skilled in the art that various changes in form and detail may be made therein without departing from the spirit and scope of the invention as defined by the appended claims.

What is claimed is:

1. A system for determining the availability of a plurality of mobile assets comprising:
    a plurality of mobile asset sources for providing the mobile assets that may be made available, the mobile assets being classifiable into two or more asset types, and each mobile asset comprising a location detector for providing position data, at least one mobile asset sensor for detecting a parameter relating to the availability of the mobile asset, and a wireless communication interface for transmitting data that includes at least the parameter relating to the availability of the mobile asset; and
    a data center comprising a receiver for receiving the mobile asset availability parameter data from the mobile assets and a processor programmed for determining the type of each mobile asset, processing the availability parameter data, and using the availability parameter data to determine the availability of each mobile asset,
    wherein the parameter relating to availability of an asset is taken from a sensor that is of a different type for at least two different types of assets, and wherein at least one type of asset uses a sensor that determines asset availability from a cargo loaded/unloaded status sensor;
    wherein the parameter relating to the availability of at least one other type of asset further includes at least one of mobile asset motion, mobile asset door activity, mobile asset security data, mobile asset location, mobile asset mileage, mobile asset fuel level and tire status.

2. The system of claim 1 wherein the processor develops a record of asset status and availability information of each mobile asset and uses the record and the data to determine the availability of each mobile asset.

3. The system of claim 1 wherein the plurality of mobile asset sources include trucking rental companies.

4. The system of claim 1 wherein the plurality of mobile asset sources further include trucking companies that make available mobile assets on a rental basis.

5. The system of claim 1 wherein the wireless communication mechanism provides two way text messaging between a user and a mobile asset driver.

6. The system of claim 1 wherein the data center has a server system having a network connection to a user computer for providing information relating to the availability of the mobile assets.

7. The system of claim 1 additionally comprising an asset monitoring sensor is located at a mobile asset garage to detect the presence of mobile assets.

8. The system of claim 1 further comprising a manual input communication link connected to the data center for receiving manual input of data relating to the availability of the mobile assets.

9. The system of claim 8 wherein the manual input of the data includes the type of a mobile asset.

10. The system of claim 1 wherein at least one type of the mobile assets includes a tractor-trailer.

11. A system for exchanging data relating to the availability of mobile assets comprising:
    a plurality of mobile asset sources for providing the mobile assets that may be made available, wherein the mobile assets are of two or more types, and wherein mobile asset availability data for each type of mobile asset is derived from a sensor that is different for at least two of the asset types;
    a processor programmed for determining the availability of each mobile asset from the corresponding mobile asset availability data, and receiving and processing requests for available mobile assets; and
    a plurality of user computers for providing user access to information relating to the availability of the mobile assets and user interface to request one or more mobile assets that are determined to be available,
    wherein, for at least one type of mobile asset, the mobile asset availability data includes at least cargo loaded/unloaded status;
    wherein the mobile asset availability data of at least one other type of asset further includes at least one of mobile asset motion, mobile asset door activity, mobile asset security data, mobile asset location, mobile asset mileage, mobile asset fuel level and tire status.

12. The system of claim 11 wherein the plurality of mobile asset sources include trucking rental companies.

13. The system of claim 11 wherein the plurality of mobile asset sources further include trucking companies that make available mobile assets on a rental basis.

14. The system of claim 11 wherein the processor is a server system having a network connection to the plurality of user computers for providing information relating to the availability of the mobile assets.

15. The system of claim 14 wherein the server system receives and processes requests for available mobile assets.

16. The system of claim 11 wherein the processor develops and stores a record of asset status and availability information of each mobile asset in a memory.

17. The system of claim 11 wherein the plurality of user computers further provide user access to information relating to the status of authorized mobile assets.

18. The system of claim 17 wherein the authorized mobile assets include mobile assets that are owned, leased or rented by a user.

19. The system of claim 11 wherein the plurality of user computers are used to request availability of a subset of available mobile assets from the plurality of mobile asset sources.

20. The system of claim 11 wherein one of the plurality of user computers is used by one of the plurality of mobile asset sources to make a mobile asset available.

21. A system for exchanging data relating to the availability of mobile assets comprising:
- a plurality of mobile asset sources for providing the mobile assets that may be made available, wherein the mobile assets are of two or more types and wherein each mobile asset provides mobile asset availability data that, for at least two types of mobile assets, is derived from sensor data that differs depending on the mobile asset type, with at least one type of asset using cargo loaded/unloaded status as mobile asset availability data;
- a data center for providing the availability of the mobile assets;
- an intermediary business entity having a communication link to the data center for providing a network of users and the plurality of mobile asset sources to efficiently manage the mobile assets that are made available by using the availability information from the data center; and
- a plurality of user computers having a communication link to the intermediary business entity for providing user interface to request one or more mobile assets that are determined to be available;
- wherein the mobile asset availability data of at least one other type of asset further includes at least one of mobile asset motion, mobile asset door activity, mobile asset security data, mobile asset location, mobile asset mileage, mobile asset fuel level and tire status.

22. The system of claim 21 wherein the intermediary business entity forms agreements with the users and the plurality of mobile asset sources to conduct transactions of the available mobile assets.

23. The system of claim 21 wherein one of the plurality of user computers is used by one of the plurality of mobile asset sources to make a mobile asset available.

24. The system of claim 21 wherein the plurality of mobile asset sources include trucking rental companies.

25. The system of claim 21 wherein the plurality of mobile asset sources further include trucking companies that make available mobile assets on a rental basis.

26. The system of claim 21 wherein the data center comprising a computer for determining the availability of each mobile asset.

27. The system of claim 21 wherein the users and the plurality of mobile asset sources efficiently manage the available mobile assets by conducting transactions including rental transactions and exchanges.

28. The system of claim 21 wherein the intermediary business entity automates recurring rental transactions and exchanges between a common long-term user and a mobile asset source.

29. The system of claim 21 wherein the intermediary business entity comprises a sewer for providing the communication link to the plurality of user computers through the network.

30. The system of claim 21 wherein the intermediary business entity further comprises a memory for storing a record of transactions.

31. The system of claim 30 wherein the intermediary business entity determines a rental charge of a mobile asset based on the record of transactions and the agreement.

32. The system of claim 30 wherein the intermediary business entity determines the transaction balance of a mobile asset source based on the record of transactions.

33. The system of claim 30 wherein the intermediary business entity determines the transaction balance of a user based on the record of transactions.

* * * * *